United States Patent [19]

Shea, Jr.

[11] 4,388,917

[45] Jun. 21, 1983

[54] TRIANGULAR SOLAR COLLECTOR

[76] Inventor: H. Richard Shea, Jr., 440 Walker Rd., Great Falls, Va. 22066

[21] Appl. No.: 225,643

[22] Filed: Jan. 16, 1981

[51] Int. Cl.³ .............................................. F24J 3/02
[52] U.S. Cl. ................................... 126/450; 126/429; 126/449
[58] Field of Search ............... 126/449, 450, 428, 429, 126/431, 430, 436, 417

[56] References Cited

U.S. PATENT DOCUMENTS

| | | | |
|---|---|---|---|
| 4,061,129 | 12/1977 | Wilson | 126/436 X |
| 4,067,316 | 1/1978 | Brin et al. | 126/449 X |
| 4,088,266 | 5/1978 | Keyes | 126/449 X |
| 4,138,061 | 2/1979 | Besack | 126/436 X |
| 4,207,868 | 6/1980 | Peterson | 126/436 X |
| 4,257,396 | 3/1981 | Reinert | 126/449 |
| 4,294,228 | 10/1981 | Kruger et al. | 126/430 |
| 4,304,223 | 12/1981 | Novinger | 126/449 X |

Primary Examiner—Larry Jones
Attorney, Agent, or Firm—Leitner, Palan, Martin & Bernstein

[57] ABSTRACT

A solar collector is provided having a substantially triangular-shaped housing defined by a base and a pair of converging side walls. The housing of the collector includes an outlet adjacent the top of the housing, an inlet, a central area and a pair of outer end areas. The problem of stagnation of air in the outer end areas is solved by providing barrier means adjacent the side walls for creating air ducts connecting the outer end areas to the outlet. The intake air is distributed along the base of the collector by an inverted T-shaped air distributor means.

17 Claims, 6 Drawing Figures

U.S. Patent   Jun. 21, 1983   Sheet 1 of 2   4,388,917
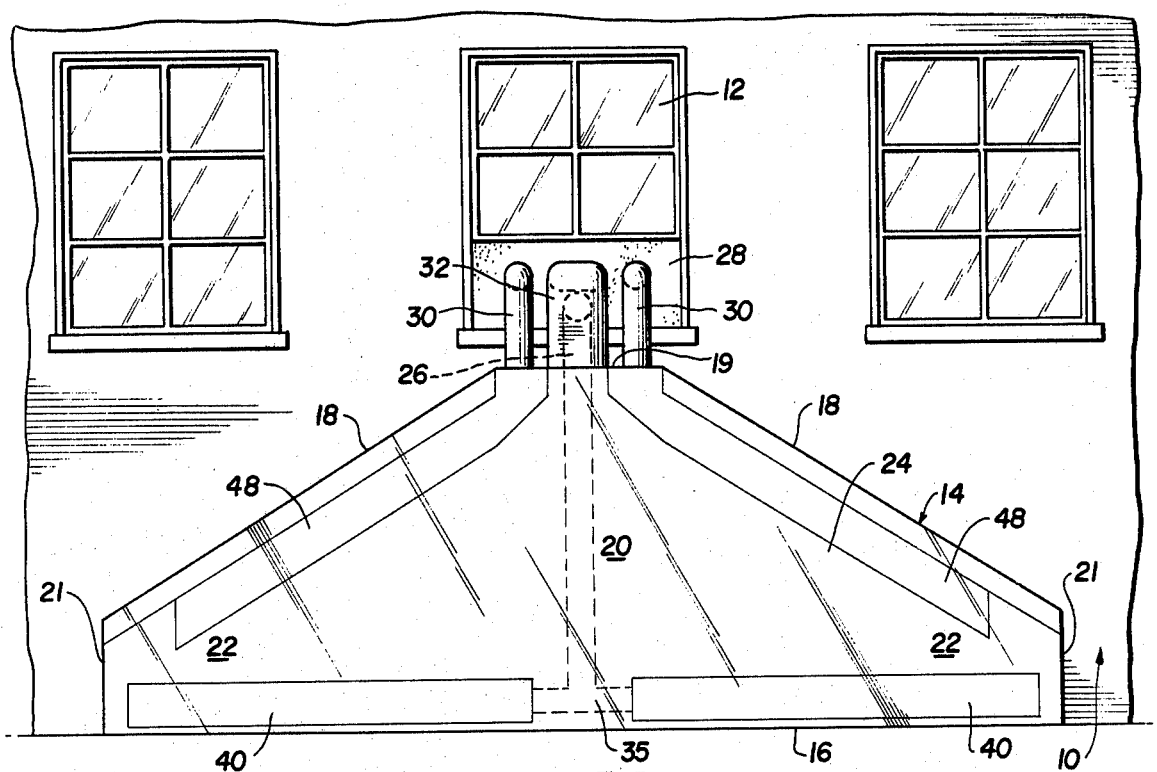
FIG.1
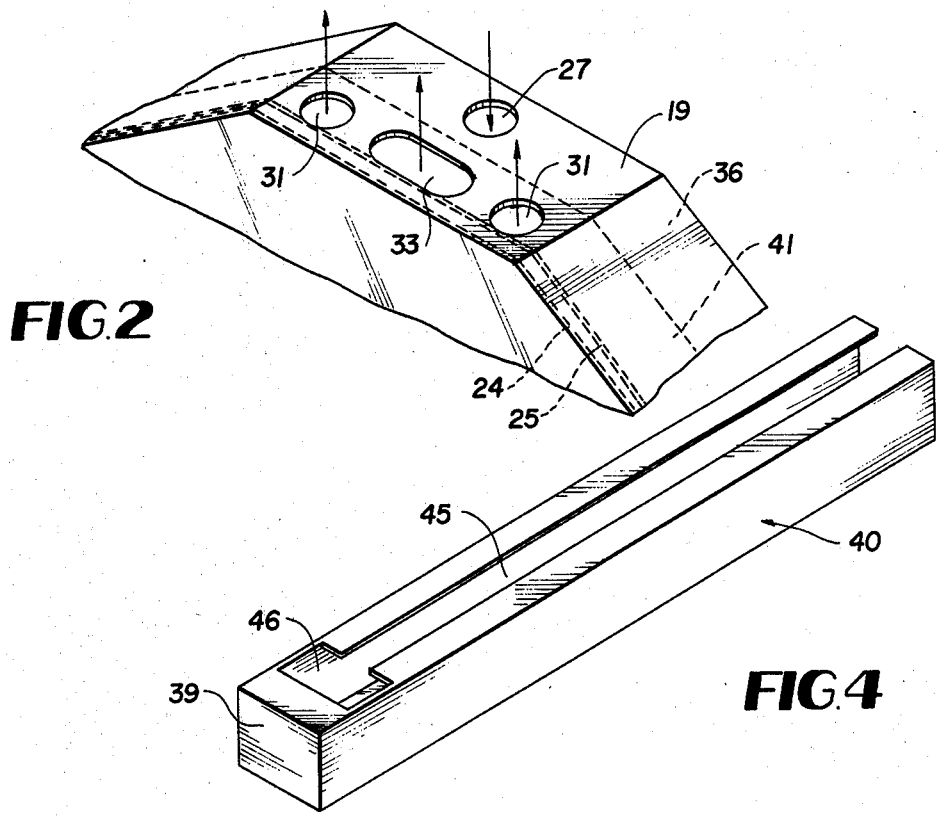
FIG.2
FIG.4

TRIANGULAR SOLAR COLLECTOR

BACKGROUND OF THE INVENTION

This invention relates to solar heating by convection and, more particularly, to a triangular-shaped solar energy collector.

The concept of using the sun as the source of energy in a heating system is well known. This type of system involves collecting incident solar radiation, transferring this radiation into heat energy, and then using the heat energy to heat the inside of a building. The solar radiation is collected by a solar collector which typically is installed on the roof or in a window of the building. One common type of prior art solar collector utilizes an absorbing material placed within the collector to collect the incident solar radiation. The air within the collector is then heated by the absorber and delivered to the inside of the building with the aid of a blower. Such a system is seen in U.S. Pat. No. 4,100,914. Another common prior art collector is the "convection" collector, wherein the natural convection currents caused by the heating and cooling of the air are utilized to circulate the air. This type of collector is seen in U.S. Pat. No. 4,135,490. The natural convection collector offers some advantages over the blower-type collector in that it is generally simpler in design, and doesn't utilize electricity.

A problem arises, however, when a substantially triangular-shaped natural convection collector is used. In particular, the convection currents will move the air in the central area of the collector since the heated air located there will rise to the relatively cooler air inside the building. However, as the hot air in the central area rises and exits the outlet of the collector, it cuts off the movement of air from the outer end areas of the collector to the outlet. More specifically, the air in the outer end areas will not blend with the rising air from the central area since this air is moved by a relatively strong air current which serves to shear the weaker air currents in the outer end areas. This shearing effect causes stagnant air pockets to be formed in the outer end areas, which raise the operating temperature of the collector and result in greater heat loss and inefficiency.

Many prior art solar collectors are also uneconomical in that they require permanent installation on the roof or in the window of the building. In particular, it is often necessary for the user to physically modify the structure in order to effectively install the collector. These modifications are often extremely costly and burdensome.

SUMMARY OF THE INVENTION

It is therefore an object of the present invention to provide a substantially triangular-shaped solar energy collector of the convection type wherein there is no stagnation of air in the outer end areas of the collector during any portion of the collector's operating cycle.

It is another object of the invention to provide a substantially triangular-shaped solar energy collector which is designed to be disposed exterior a building, adjacent a window thereof, and which requires no modification of the building for effective installation.

It is a further object of the present invention to provide a collector of the type described which may be simply produced in modular kit form.

These and other objects are attained by providing a collector with a substantially triangular-shaped housing having a base and a pair of converging side walls. The housing includes absorbing means to absorb the incident solar radiation. The front of the housing is covered by a panel which allows the radiation to enter the collector. An air distributor means having an inverted T-shape is used to distribute the intake air along the base of the collector. The problem of stagnation in the outer end areas is solved by providing a barrier adjacent the side walls of the collector. In particular, this barrier creates air ducts which connect the outer end areas to the outlet of the collector. The ducts prevent the rising air in the central area from cutting off the movement of air from the outer end areas to the outlet of the collector. The air ducts include a number of spaced apertures along their lengths as well as air foils adjacent these apertures. This structure provides for a "venturi-effect" which enhances the air flow out of the collector after the air ducts become heated. The housing includes a connecting plate disposed between the converging side walls which includes ports for both the inlet and outlet of the collector. An air space is provided between the absorbing means and the panel such that the heated air may more readily flow through the collector.

The air distributor means includes an air distributor conduit having an inlet in the connecting plate, a T-joint attached to the conduit adjacent the base, and horizontally-lying air tubes extending along the base from the T-joint. The air tubes, which include exhaust ports at their ends, are each surrounded by a sleeve. A port and a longitudinal slot are provided in the top of each sleeve to distribute the air along the base of the collector. The port has a large cross-sectional area relative to the longitudinal slot and is adjacent the exhaust port in the air tube. This structure insures that the outer end areas are not suffocated by the central area "grabbing up" the intake air before it reaches the end areas.

BRIEF DESCRIPTION OF THE DRAWINGS

FIG. 1 is a front view of the collector disposed against a building.

FIG. 2 is a perspective view of the top of the collector showing various inlet and outlet ports and the direction of air flow.

FIG. 4 is a perspective view of one of the sleeves shown in FIG. 3.

DESCRIPTION OF THE PREFERRED EMBODIMENT

Figure 3:
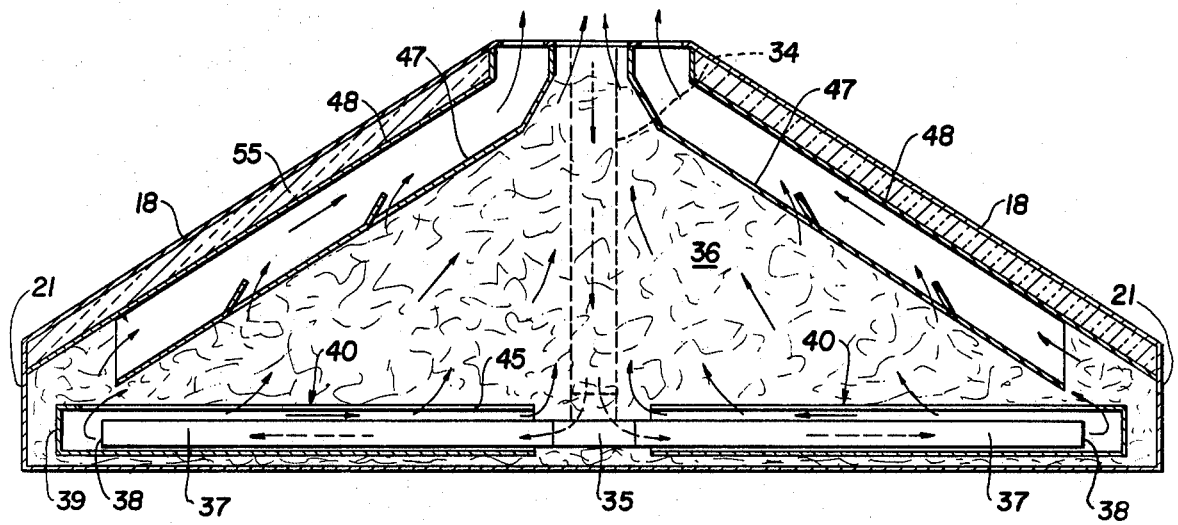
FIG. 3 is a front view of the interior of the collector showing the details of the novel structure.

FIG. 1 shows a portion of a building 10 which includes a window 12. The collector 14 of the present invention is designed to be disposed against the side of the building 10. The base 16 of the collector 14 rests against the ground or a suitable foundation thereon. Such a foundation may be made of wood or cement.

As seen in FIG. 1, the collector 14 has a substantially triangular-shaped housing defined by the base 16 and side walls 18 which converge at a connecting plate 19. The side walls 18 and the base are joined by the end walls 21. It is important to the present invention that end walls 21 are relatively short in length compared to the base 16 such that the collector has a substantially triangular-shape. The collector housing includes three distinct areas; a central area 20, and a pair of outer end areas 22. The central area 20 is defined by the volume of the collector which lies beneath the connecting plate 19. The outer end areas 22 include the remainder of the collector's volume. The housing of the collector 14 may be made out of any suitable rigid material, such as metal or hard plastic. The front of the collector is covered by a panel 24, which is made from any suitable solar transparent material, such as glass or plastic. This panel allows the incident solar radiation to pass into the interior of the collector 14, where it can be absorbed. In the preferred embodiment of the invention, two transparent panels are used to prevent heat loss. These panels are secured together near the base 16 of the collector by any suitable means. The upper edge of the inner panel 25 rests against the outlet ports of the collector as seen in FIG. 2 such that a tapered air pocket is formed between the panels. This pocket traps any solar energy which might otherwise be dissipated to the exterior of the collector through conduction.

It is an important feature of the present invention that the collector 14 be readily connectable to the building 10 for operation. In particular, FIG. 1 shows the air pipes which collect the cooler air from within the building and redistribute the air heated by the collector. As seen in FIG. 1, a plate 28, which is preferably made of foam rubber insulation, is provided to fit in the partially-opened window 12. The air within the building is collected by first air pipe 26, which has an inlet in plate 28 and an outlet at the connecting plate 19. As seen in FIG. 2, the building air travels through an intake port 27 provided in the connecting plate 19, and flows to the interior of the collector where it can be heated. Similarly, the air heated by the collector is distributed into the building by second and third air pipes 30 and 32 having inlets in connecting plate 19 and outlets in plate 28. Second air pipes 30 distribute the heated air from outlets 31 in the connecting plate 19, which are connected to the air ducts 48 along the sides of the collector, to the plate 28. The third air pipe 32 distributes the heated air from the outlet port 33 in the connecting plate 19, which is connected to the central area 20 of the collector, to the plate 28. The outlet ports 31 and 33 define an outlet in the connecting plate 19 through which air heated by the collector passes. The intake port 27 in the connecting plate 19 defines an inlet in the housing. Although the connecting plate is explicitly shown, the outlet of the collector may be taken from any convenient location adjacent the top of the housing. Also, the inlet of the collector may be disposed in any convenient area of the housing. To prevent heat loss, the air pipes 26, 30 and 32 may be enclosed in an insulated housing.

It should be evident that the above structure provides a simple, yet efficient method for connecting the solar collector to the building 10. This structure does not require any modifications to the existing building such as is common in many prior art collectors. The use of the plate 28 and the various air pipes allows the homeowner to install or disconnect the collector with a minimum amount of effort.

FIG. 3 shows a more detailed view of the collector structure of the present invention. An air distributor conduit 34 is connected to the intake port 27 in the connecting plate 19 to bring the intake air into the collector housing. This conduit, which is preferably made of a plastic material, is embedded in an absorbing material 36, such as fiberglass. This material, which is blackened to increase its absorption characteristics, preferably covers the interior back and end walls of the collector. As best seen in FIG. 2, a layer of air 41 is thus provided between the absorbing material 36 and the transparent panels 24 and 25. This structure is advantageous since the fiberglass, although porous, offers some resistance to air flow. The use of the air layer 41 allows the convection currents to move the heated air more readily out of the collector. Also, if the collector was completely filled with the absorbing material, it would quickly become clogged due to the inherent filtering characteristics of the fiberglass.

Referring back to FIG. 3, the air distributor conduit 34 is connected to two horizontally-lying air tubes 37 adjacent the base 16 by T-joint 35. This joint brings together the air tubes. Exhaust ports 38 are provided in the air tubes 37 at their ends. The air tubes 37 lie within rectangular-shaped sleeves 40, which are preferably made of metal and painted black to improve their heat absorption characteristics. The end 39 of the sleeve 40 is spaced from the exhaust port 38 and causes the incoming air to turn 180° without substantially impeding the air flow. As seen in FIG. 4, each sleeve 40 includes a longitudinal slot 45 and a port 46 in its top surface. The port 46 is adjacent an end wall 21 and has a large cross-sectional area relative to the longitudinal slot 45. The slot 45 and port 46 insure that the outer end areas 22 are not suffocated by the central area "grabbing up" the intake air before it can reach the outer end areas.

The above structure defines an inverted T-shape which allows the cool intake air to be distributed along the base 16 of the collector. The blackened metal sleeves, which may also be cylindrical in shape, serve to preheat the intake air as it travels along the base 16 of the collector.

Figure 5:
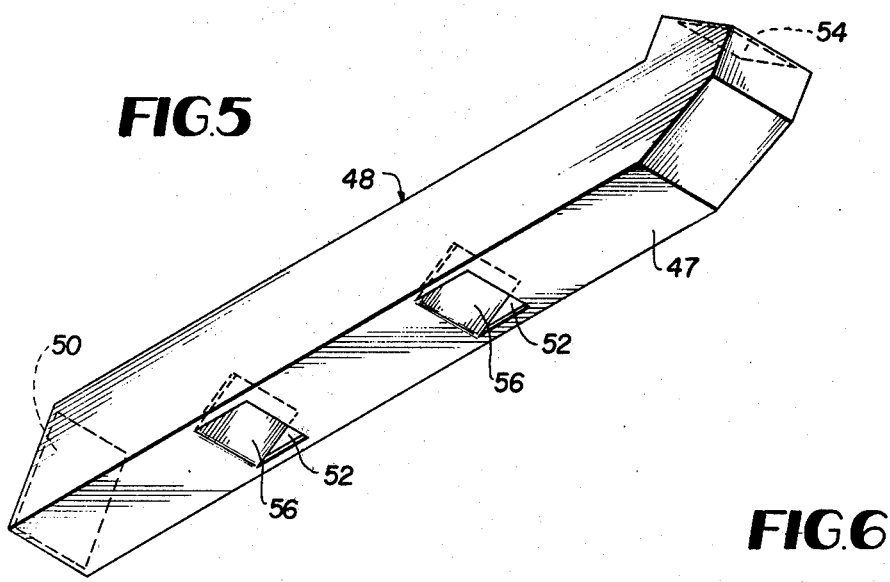
FIG. 5 is a perspective view of one of the air ducts shown in FIG. 3.

According to another important feature of the present invention, a barrier 47 is provided adjacent the side walls 18 for creating air ducts 48 as shown in FIG. 3. These air ducts serve to connect the outer end areas 22 to the distinct outlets 31 in the connecting plate 19 to prevent stagnation of air in the outer end areas when the heated air in the central area rises and cuts off the circulation from the outer areas. As best seen in FIG. 5, each one of the air ducts 48 includes an inlet port 50 adjacent the base 16, a number of spaced apertures 52 in the barrier 47, and an outlet port 54 fluidly connected to an outlet 31 in the connecting plate 19. Referring back to FIG. 3, the side walls 18 have a double panel construction wherein the space between the panels is filled with insulation 55 to prevent heat loss. The ducts 48 are preferably made of blackened metal for increased absorbency of solar radiation. This structure, along with the use of the insulating material 55 in the side walls 18, allows the ducts to store heat during peak hours of operation, this heat being released later when the collector begins to cool down.

Referring back to FIG. 5, air foils 56 may be provided adjacent the apertures 52 for creating a "venturi-effect" in the air flow through the air ducts. In particular, as the ducts heat up, air moves through at a higher velocity. As the air passes around the air foils a back pressure is created which pulls in more air from below the ducts 48. This structure thus enhances the circulation of air throughout the housing after the air ducts become heated.

The operation of the solar collector of the present invention will now be explained with reference to the figures described above. Assuming that the air ducts 48 are not present, the air in the central area will be heated, rise and exit the collector through the outlet port 33. This air will then pass through the third air pipe 32 and into the building. Simultaneously, the cooler air from within the building will be drawn into the collector via first air pipe 26 and the air distributor conduit 34. However, as the heated air rises, it shears the movement of air from the outer end areas of the collector and thus stagnation occurs in the outer end areas 22.

To solve this problem, the barrier 47 is provided adjacent side walls 18 of the collector for the purpose of creating air ducts which connect the outer end areas and the outlet of the collector. In particular, the air ducts 48 present a barrier to the rising air in the central area 20 such that this air cannot shear the movement of air from the outer end areas. The use of the distinct outlet ports 31 in the air ducts 48 allow the outer end areas to be connected to the collector outlet without the air within the ducts being subjected to the shearing effect of the rising air from the central area.

Once the air in the outer end areas 22 begins to move up the air ducts 48, it is further heated by the hot air below the air ducts. This is accomplished by the flow of this air through the spaced apertures 52 in the barrier 47. The barrier prevents further stagnation when the air rising through the apertures would otherwise tend to shear the air from the outermost end areas of the collector, by always providing a connection between all portions of the outer end areas of the outlet.

The ducts begin to heat up during the peak hours of operation due to their blackened surfaces and the adjacent absorbing material 36. The air foils 56 help create a "venturi-effect" in the ducts 48 to enhance the flow of heated air out of the collector during this time. Specifically, as the ducts heat up, the air velocity also rises. As the air passes over the foils 56, a back pressure is developed which pulls in more air from below the air ducts 48, thus improving circulation. Any residual heat stored in the air ducts during these peak hours is released when the collector begins to cool down. This feature insures that the building will continue to be heated for some time after the sun has set.

Figure 6:
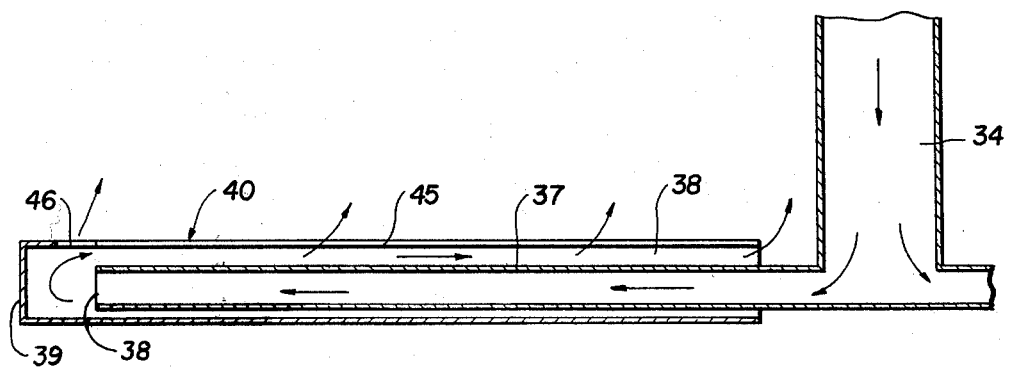
FIG. 6 is a flow schematic showing the air flow through the air distributor means in FIG. 3.

As the heated air flows out of the air ducts 48 and into the building via second air pipes 30, more cooler air is drawn into the collector. This air is distributed along the base of the collector by the T-shape distributor means seen in FIG. 3. In particular, the air travels through the air distributor conduit 34, the T-joint, the horizontally-lying air tubes 37, and is released from the exhaust ports 38. The air released from these exhaust ports is distributed along the base 16 of the collector by the port 46 and the longitudinal slot 45 in the sleeve 40, and then heated by the absorbing material 36. The structure of the port 46 and the longitudinal slot 45 serves to insure that the outer end areas receive a readily available supply of intake air. This function can best be seen in FIG. 6. In particular, the structure requires that the intake air make a 180° turn to flow along the sleeve. This turn reduces the speed of the air. Also since the port 46 has a large cross-sectional area relative to the longitudinal slot 45, more air will flow out of the port 46. This structure, in conjunction with the reduction of the air velocity, provides air to the outer end areas at all times.

It should be evident that a substantially triangular-shaped solar collector has been provided which is easy to manufacture, has few internal parts, and is readily installed with no modification to the existing structure. In view of the above description, it should be seen that the several objects of the invention are achieved and other advantageous results attained.

Although the invention has been described and illustrated in detail, it is clearly understood the same is by way of illustration and example only and is not to be taken by way of limitation. The spirit and scope of the present invention are to be limited only by the terms of the appended claims.

What is claimed:

1. A solar collector comprising:
   a substantially triangular-shaped housing having a base and a pair of converging side walls such that the width of said housing decreases further from said base, said housing including an outlet adjacent the top of said housing, an inlet, a central area generally beneath said outlet, and a pair of outer end areas each spaced apart generally horizontally from said central area;
   absorbing means in said housing to absorb incident solar radiation;
   a panel of solar transparent material, said panel being secured to the front of said housing for allowing said incident solar radiation to pass through said panel to be incident upon and absorbed by said absorbing means;
   air distributor means for distributing cool air from said inlet along said base of said housing; and
   barrier means inclined from the vertical and adjacent said converging side walls for creating air ducts connecting said outer end areas to said outlet to prevent stagnation of air in said outer end areas.

2. A solar collector as defined in claim 1 wherein each of said air ducts includes an intake port adjacent said base, a number of spaced intake apertures in said barrier means along the bottom surface thereof, and an outlet port at said outlet.

3. A solar collector as defined in claim 2 wherein each of said air ducts further includes air foils adjacent said spaced intake apertures and interior of said air ducts to create a venturi effect in said air ducts to enhance the air flow out of said outlet after said air ducts contain heated air.

4. A solar collector as defined in claim 1 wherein said air distributor means has an inverted T-shape such that the horizontally extending member thereof extends along said base.

5. A solar collector as defined in claim 4 wherein said inverted T-shape air distributor is disposed such that the vertically extending member of said inverted T is connected to said inlet and air entering said inlet is distributed in said solar collector from the ends of said horizontally extending members of said inverted T.

6. A solar collector as defined in claim 1 which further includes a connecting plate disposed between said converging side walls; wherein said inlet and said outlet are disposed in said connecting plate.

7. A solar collector as defined in claim 6 wherein said outlet includes distinct outlet ports connected to said air ducts and said central area.

8. A solar collector as defined in claim 1 wherein said absorbing means is a fiberglass material which is blackened to improve the absorption characteristics of said material.

9. A solar collector as defined in claim 8 wherein said absorbing means is disposed throughout said central and outer end areas.

10. A solar collector as defined in claim 1 wherein an air space is provided between said absorbing means and said panel such that heated air may more readily flow out of said outlet and a second panel of solar transparent material is secured in front of said panel adjacent said air space.

11. A solar collector as defined in claim 2 wherein said barrier means and air ducts are parallel to and insulated from said converging sides and plural outlet ports are provided at said outlet such a distinct outlet port for air heated in said central area is provided separate from said air duct outlet ports.

12. A solar collector comprising:
a substantially triangular-shaped housing having a base and a pair of converging side walls, said housing including an outlet adjacent the top of said housing, an inlet, a central area, and a pair of outer end areas;
absorbing means in said housing to absorb incident solar radiation;
a panel of solar transparent material, said panel being secured to the front of said housing for allowing said incident solar radiation to pass through said panel to be absorbed by said absorbing means; and
air distributor means for distributing cool air from said inlet along said base of said housing, said air distributor means having an inverted T-shape such that the horizontally extending member of said inverted T lies substantially parallel to said base.

13. A solar collector as defined in claim 12 wherein said air distributor means comprises an air distributor conduit having an intake port at said inlet, a T-joint attached to said conduit adjacent said base, and horizontally-lying air tubes extending along said base from said T-joint from which air is distributed into said absorbing means.

14. A solar collector comprising:
a substantially triangular-shaped housing having a base and a pair of converging side walls, said housing including an outlet adjacent the top of said housing, an inlet, a central area, and a pair of outer end areas;
absorbing means in said housing to absorb incident solar radiation;
a panel of solar transparent material, said panel being secured to the front of said housing for allowing said incident solar radiation to pass through said panel to be absorbed by said absorbing means; and
air distributor means for distributing cool air from said inlet along said base of said housing, said air distributor means having an inverted T-shaped and comprising an air distributor conduit having an intake port at said inlet, a T-joint attached to said conduit adjacent said base, horizontally-lying air tubes extending along said base from said T-joint, and a sleeve disposed around each horizontally-lying air tube for distributing the air from the exhaust ports along said base.

15. A solar collector as defined in claim 14 wherein each sleeve includes a port and a longitudinal slot in the top surface of said sleeve, said port being adjacent the junction of said base and said side wall and having a large cross-sectional area relative to said longitudinal slot to insure that said outer end areas receive a readily available supply of air.

16. A solar collector as defined in claim 14 wherein said sleeves are painted black for preheating the intake air.

17. A solar collector as defined in claim 14 wherein said sleeve is closed at the end adjacent said exhaust port for redirecting the air toward said central area.

* * * * *